(12) United States Patent
Lozornio (10) Patent No.: US 10,883,570 B1
(45) Date of Patent: Jan. 5, 2021

(54) LOCKING BUCKLE SYSTEM

(71) Applicant: Marco Antonio Lozornio, Laguna Woods, CA (US)

(72) Inventor: Marco Antonio Lozornio, Laguna Woods, CA (US)

( * ) Notice: Subject to any disclaimer, the term of this patent is extended or adjusted under 35 U.S.C. 154(b) by 0 days.

(21) Appl. No.: 16/365,552

(22) Filed: Mar. 26, 2019

Related U.S. Application Data (60) Provisional application No. 62/654,530, filed on Apr. 9, 2018.

(51) Int. Cl.
  *F16G 11/14* (2006.01)
  *F16G 11/10* (2006.01)
  *F16G 11/04* (2006.01)

(52) U.S. Cl.
  CPC .......... *F16G 11/103* (2013.01); *F16G 11/046* (2013.01); *F16G 11/143* (2013.01); *Y10T 24/3918* (2015.01)

(58) Field of Classification Search
  CPC .. F16G 11/103; F16G 11/046; Y10T 24/3918; Y10T 24/3916
  See application file for complete search history.

(56) References Cited

U.S. PATENT DOCUMENTS

| | | | | |
|---|---|---|---|---|
| 192,789 | A * | 7/1877 | Peteler | F16G 11/00 24/129 R |
| 1,231,309 | A * | 6/1917 | Stout | F16G 11/10 24/130 |
| 3,267,540 | A * | 8/1966 | Wolcott | B65D 63/14 24/130 |
| 3,675,276 | A * | 7/1972 | Nuse | A01K 91/04 24/130 |
| 5,205,687 | A * | 4/1993 | Boyland | B60P 7/0823 24/130 |
| 2005/0257348 | A1* | 11/2005 | Byers | B65D 63/109 24/16 R |
| 2011/0126382 | A1* | 6/2011 | Kirkham | A61B 17/1322 24/16 R |
| 2016/0355121 | A1* | 12/2016 | Gertsma | B60P 7/0846 |

* cited by examiner

*Primary Examiner* — Robert Sandy
*Assistant Examiner* — Michael S Lee
(74) *Attorney, Agent, or Firm* — James F. Kirk (57) ABSTRACT

A locking buckle system having a locking work piece formed as a plate. The plate has at least a first pair of opposing channels. An elastomeric cord with a first portion of the elastomeric cord coupled to the plate. A second portion of the cord extends from the first portion and is stretched and held in tension and wrapped around one or more objects to form a bundle. A second portion of the cord is held in tension and compressed as it passes through a first channel in the plate. The elastomeric cord is stretched and forced to pass through a second of the first pair of opposing channels or through a first channel of the second opposing pair of channel. the remaining fourth portion of the elastomeric cord being forced to pass through a remaining unoccupied opposing channel.

8 Claims, 7 Drawing Sheets

FIG. 9

LOCKING BUCKLE SYSTEM

This invention claims priority from U.S. Provisional Application Ser. No. 62/654,530 filed Apr. 9, 2018 for an LOCKING BUCKLE SYSTEM having a sole inventor MARCO ANTINO LOZORINO No Government funds or time was used in making this invention

FIELD OF INVENTION

This invention relates to the field of systems used for wrapping, bailing, bundling, securing or holding items that have similar shapes. The functions listed are typically performed by a person or operator who uses his hands and in some cases, uses the hands and assistance of another to complete the task. This is the case where the strap or means for tying must provide a binding that is in tension. This innovation simplifies the task to one that uses a single person who uses only his or her two hands to achieve a binding of objects that are gripped and held immobile with the binding held in tension adjusted by the person using the locking buckle system.

BACKGROUND OF THE INVENTION

A rope, bungee, or wire is typically used to perform the tasks enumerated where a number of objects are bound together, but at the last step in the operation, the person has to call on another person to apply pressure on a point while a knot or securing means such as a clamp is formed or to the junction of rope while the the person is using both hands to stretch the rope or binding material to keep it tight as the person brings the start and end of the binding to intersect each other. ends of the binding rope together and proceeds to form a knot. If the person is using a rope or strap, the assistance of another person enables the operator to hold the ends of the binding material in tension as a knot is formed.

If the person uses a bungee to bind articles or to draw one article toward another with a force to be defined by the person, the bungee selected will have to have an initial length that provides an elastic range of adjustment that meets the requirement of the task. Bungees typically have a hook on each end of the article and use of one or more of the hooks is typically called for. The locking buckle system has hooks as well but use of one or more of the hooks to complete the binding of objects is not required. A knot is not required. The adjustable range of a Bungee without the use of a one or more hooks can be achieved by tying a knot in the two ends as with a rope; however, that process requires the assistance of another to press on the crossing point after the desired tension is obtained and the pressure has to be maintained as a knot is formed.

Use of rope or strap in applications such an adjustment device in clothing, knee pads, construction aprons, school supplies, for workmen, hair piece, in lacing shoes, accessory attachment to a back pack, binding tent poles and other equipment relating to outdoor sports is a short list of examples in which the linking material, such as a rope, a bungee or a strap would require cutting or adjusting with a third hand. The proposed locking buckle system eliminates the need for cutting to obtain an in tension adjustment.

RELATED ART is perhaps found in the fields of packaging, and storage.

SUMMARY OF THE INVENTION

It is a first object of the LBS (locking buckle system) to provide a system for bundling two or more objects. In a first embodiment, the LB has a locking work piece. The locking work piece has at least a first pair of opposing channels. The channels comprise a first channel and a second channel. The workpiece has an eyelet. An elastomeric cord is attached and the elastomeric cord has a first end at the start of an elastomeric cord sequence of portions. The portions will vary in length as required by the application. The portions are enumerated as a first portion, a second portion, a third portion, a fourth compressed portion, and an uncompressed fifth portion. The fifth portion terminates at a second end, In use, the elastomeric cord first passes thru the eyelet. There is then a means for coupling the elastomeric cord to the locking work piece.

The second portion of the elastomeric cord is then stretched and wrapped around two or more objects to apply a tensile force to draw the objects together.

The third portion of the elastomeric cord is compressed to pass through the first opposing channel. The first opposing channel has a channel width characterized to compress the elastomeric cord.

The fourth portion of the elastomeric cord is then stretched by the user and forced to pass through the second opposing channel of the locking work piece, after which the elastomeric cord exits the locking work piece to start an uncompressed fifth portion of the elastomeric cord.

It should be clear that the first pair of opposing channels is formed through the locking work piece on a common central axis.

In another alternative embodiment, a second pair of opposing channels are formed through the locking work piece, in addition to the first pair of channels. The first and second pairs of opposing channels are displaced from each other rotationally on a common rotation axis as they as they penetrate and pass through the locking work piece.

It is a second object of the LBS to provide an extension of the locking work piece that is shaped to form a hook.

DESCRIPTION OF THE INVENTION

Figure 1:
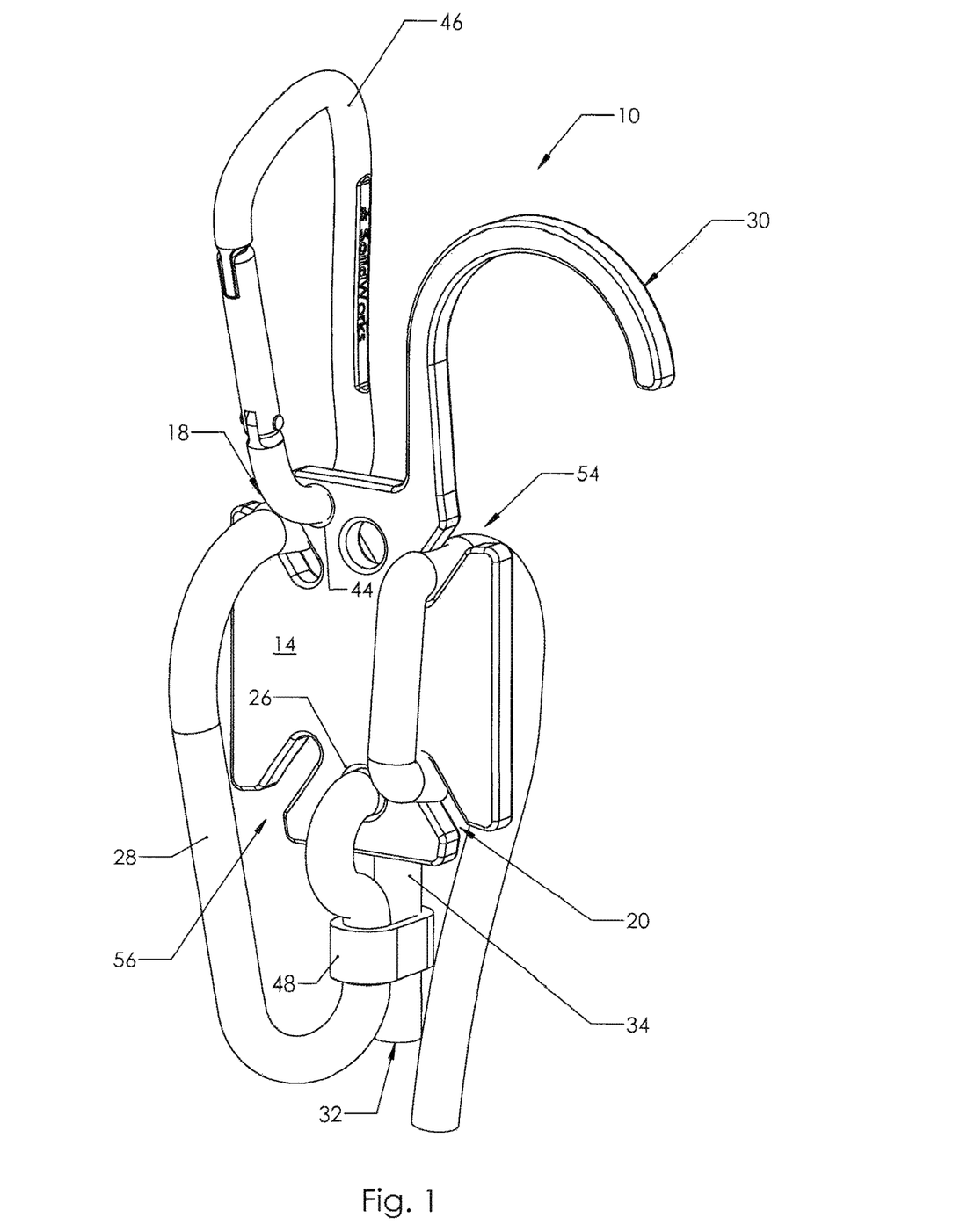
FIG. 1 is a front perspective view of the locking buckle system.
Figure 2:
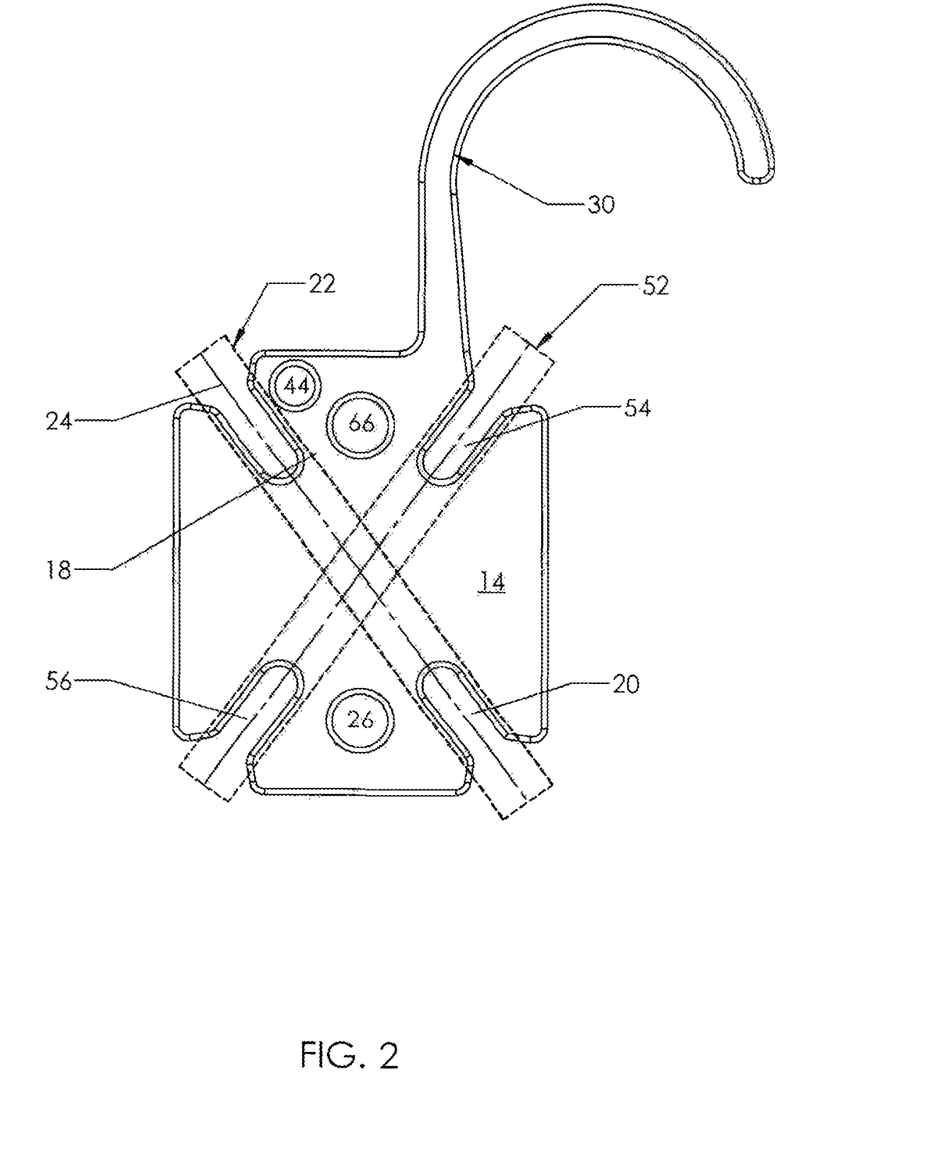
FIG. 2 is a plan view of the locking work piece formed from a plate.
Figure 3:
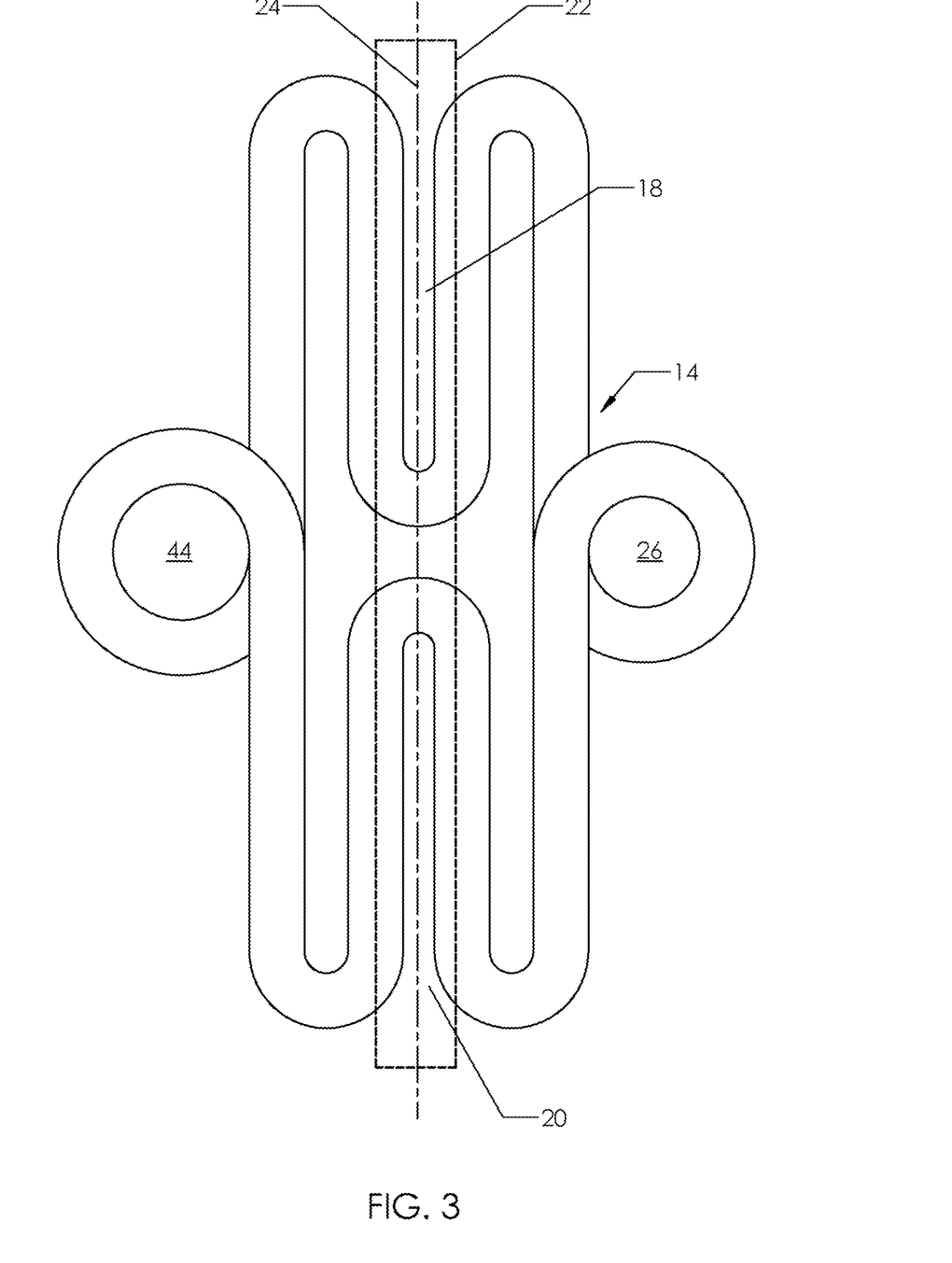
FIG. 3 is a plan view of the locking working work piece formed from cold rolled wire.
Figure 4:
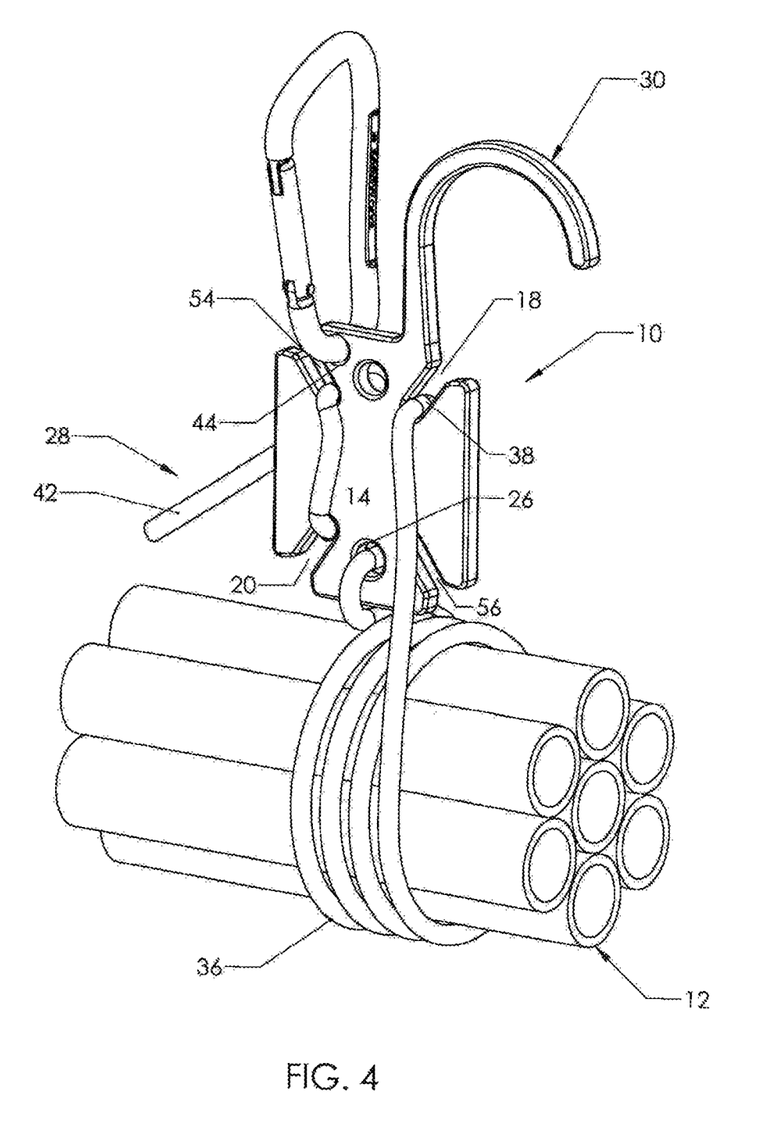
FIG. 4 is a front perspective view of the locking buckle system holding a bundle of tubular objects.

FIG. 1 shows the system 10 for bundling two or more objects such as the bundle of objects 12 depicted schematically in FIG. 4. FIG. 2 and more particularly FIG. 3 schematically shows a locking work piece 14. The locking work piece of FIG. 3 is fashioned from cold rolled steel. The locking work piece of FIG. 2 on the other hand, is fashioned from heavy gauge plastic having a thickness of typically from 0.100 to 0.188 inches or from plate steel. Reference 14 shows two enablement's of the locking work piece and applicant will show that both of the enablements are capable of performing a claimed essential function. Referring now to FIG. 2, by way of example, the drawing shows phantom rectangle 16 containing a first pair of opposing channels 18, 20. A first opposing channel 18 and a second opposing channel 20. The first channel 18 and second channel 20 are shown as being coaxially aligned on phantom central axis 24. The angle between a pair of central axis is typically 90 degrees but may be typically varied=/−15 degrees.

Referring again to the enablement of FIG. 3, phantom block 22 is shown containing a second enablement of a first opposing channel 18 and a second opposing channel 20. The first channel 18 and second channel 20 are shown as being coaxially aligned on phantom central axis 24.

Referring again to FIG. 1 and FIG. 4, an elastomeric cord 28 is shown coupled to the work piece 14 at eyelet 26. FIGS. 2, 3 and 4 also show the functional equivalent of eyelet 26.

As shown in FIG. 1, the elastomeric cord 28 has a first end 32 followed by a sequence of portions that will be characterized as comprising, a first portion 34, a second portion 36, a third portion 38, a fourth compressed portion 40, and a fifth uncompressed portion terminating at a second end 50.

As shown in FIG. 1, the elastomeric cord 28 first portion 34 passes thru the eyelet 26 and is coupled to the locking work piece 14 by a means for coupling the elastomeric cord to the locking work piece 14. As shown in FIG. 1, the means for coupling such as a clamp 48. However, it is understood that other means can be used for the same function such as a simple knot (not shown) in the portion of the elastomeric cord 28 beyond the eyelet 26, or a staple applied to hold and form the first portion of the elastomeric cord 28 in into a loop capturing the eyelet 26.

Figure 5:
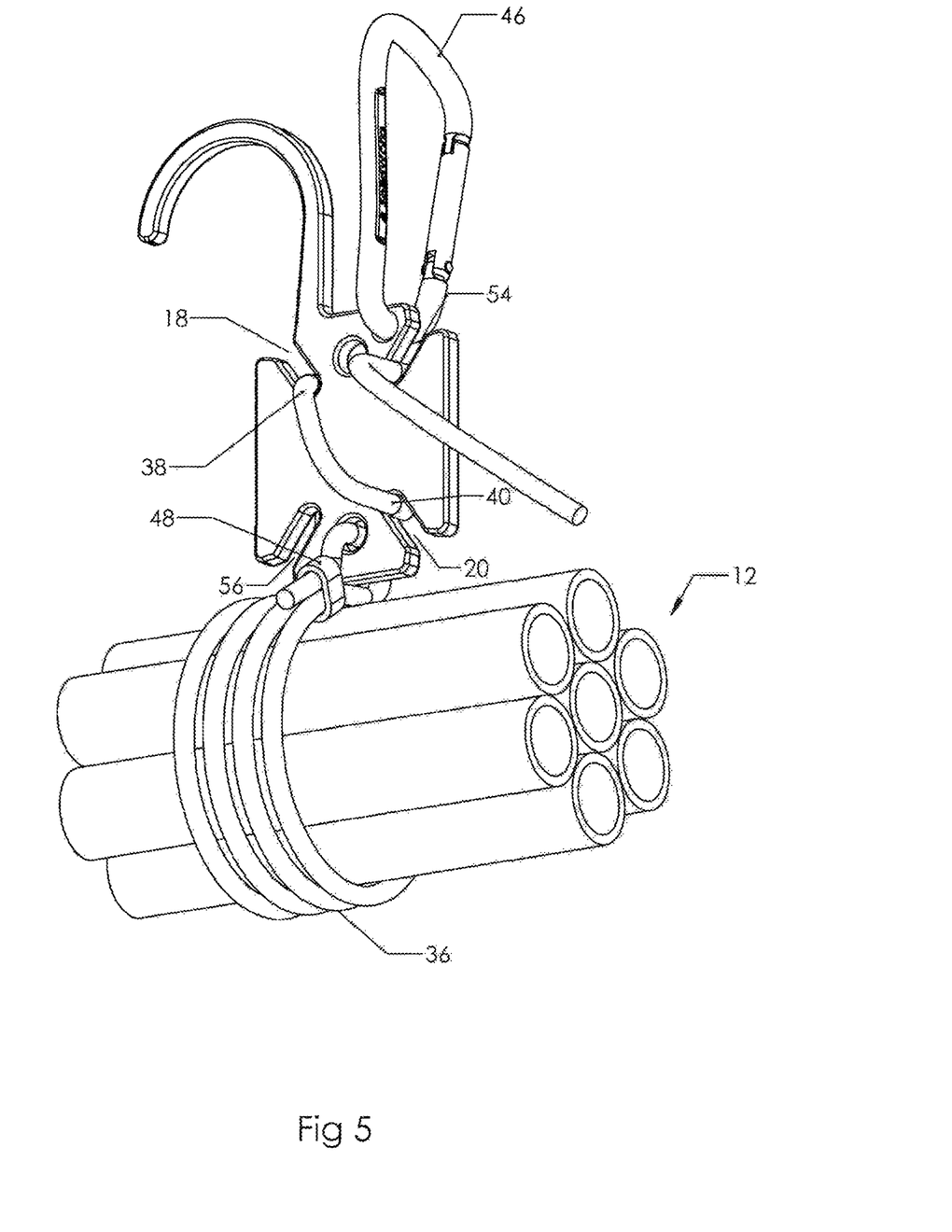
FIG. 5 is a back perspective view of the locking buckle system holding a bundle of tubular objects.
Figures 6, 7, 8:
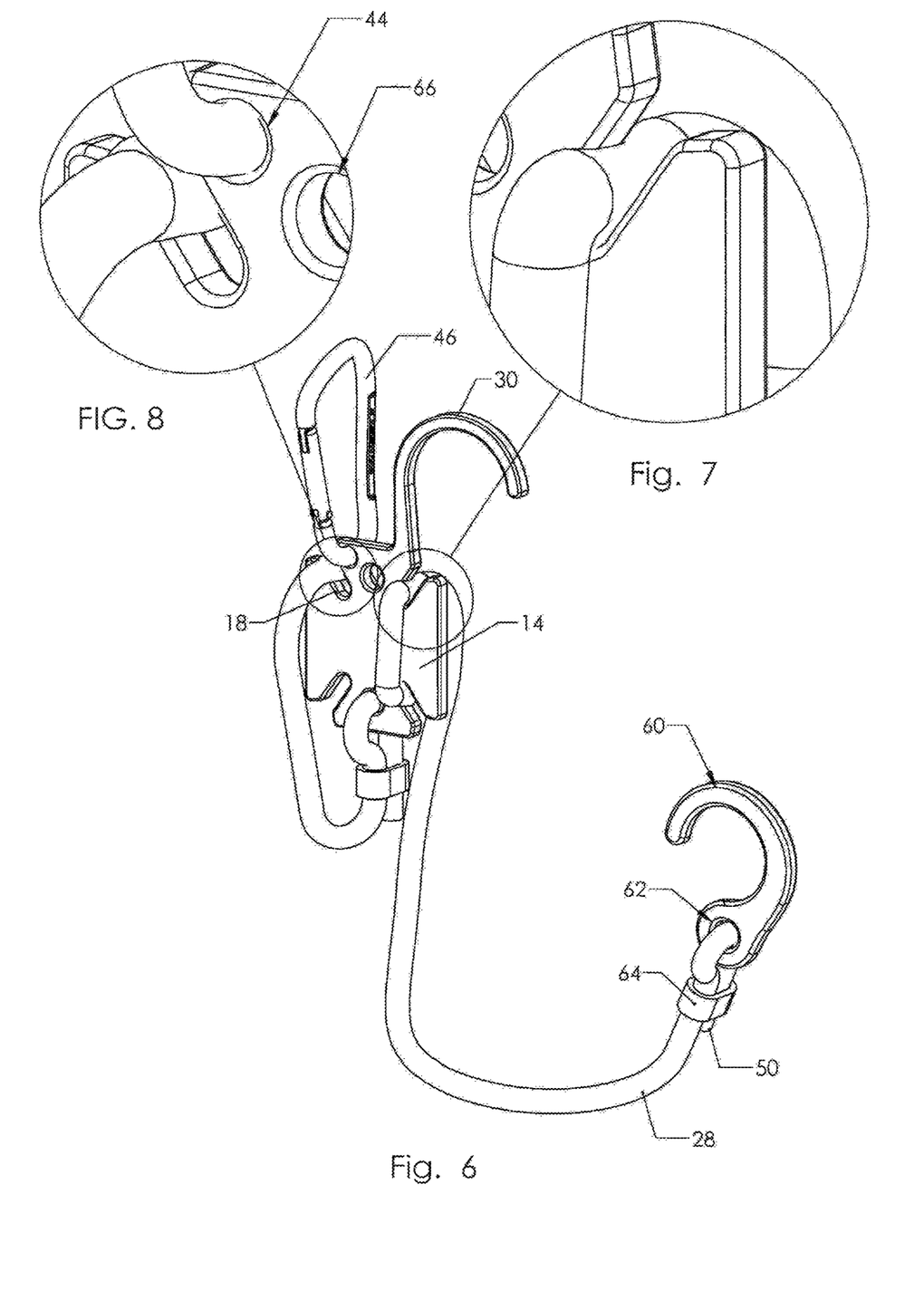
FIG. 6 is a front perspective view of the locking buckle system with an auxiliary hook.
FIG. 7 is a detailed partial perspective view showing the compression of the elastomeric cord.
FIG. 8 is a partial insert drawing taken from FIG. 6 showing the elastomeric cord being looped through the first channel of the locking workpiece.

As shown in FIGS. 4, 5 and 6, the second portion of the elastomeric cord is stretched and wrapped around two or more objects, such as those identified as tubular objects in region 12 to apply a tensile force that draws the objects together. Other objects that could be drawn together include items such as building materials, tools, instruments or even live stock. The objects that can be drawn together and retained in a bundle are as numerous as might be held together by a line or rope. Other objects that might be drawn together include pairs of objects that might require restriction to their separation.

a. FIG. 4 shows the third portion of the elastomeric cord 38 being compressed and passing pass through the first opposing channel 18.

FIGS. 4 and 5 show a channel width that compresses the elastomeric cord 28. The fourth portion of the elastomeric cord 40 is then stretched and forced to pass through the second opposing channel 20 ending at the beginning of the uncompressed fifth portion 42.

FIG. 2 shows a locking work piece 14 with a second pair of opposing channels 53 within a second phantom box 52 formed through the work piece as by stamping or by machining including using a high energy laser. The first and second pairs of opposing channels 53, that include a third channel 54 and fourth channel 56 as covered above, are symmetrically displaced from each other as they as they penetrate and pass through the work piece. As shown in FIG. 1, in yet another enablement, the locking work piece 14 has an extended region that is shaped to form a hook 30 for the convenience of fixing the position of the locking buckle system 10 at the position of the locking work piece 14 by means of capturing a fixed object with the hook 30.

FIG. 6 shows an embodiment in which an auxiliary hook 60 is attached to the end of the fifth portion of the elastomeric cord second end 50 as it is passed through an auxiliary hook eyelet 62. As shown in FIG. 6, the elastomeric cord 28 passes thru the auxiliary hook eyelet 62 and is coupled to the hook 60 by a means for coupling such as camp 64.

The auxiliary hook 60 is used to suspend the locking buckle system 10 that binds a bundle 12 from a fixed reference frame or, another work piece, or it can be used to engage with hook 30 to provide an adjustable loop that can be drawn into tension without the assistance of a third hand Auxiliary hook 60 is also used for more easily fixing the position of the locking buckle system 10 at the position of the locking work piece 14 by means of capturing a fixed object with the hook 30.

FIG. 6 shows yet another alternative embodiment of the locking work piece 14 that has an extended region that is shaped to provide an auxiliary region for an auxiliary eyelet 44. The eyelet 44 is provided for receiving a carabineer as also shown in FIG. 1. The locking work piece 14, in some embodiments, has a third eyelet 66 that can be used for storing or receiving the auxiliary hook 60.

FIG. 8 shows an enablement of an actual locking buckle system 10 shown in a grayscale image that is using a locking work piece 14 made of cold rolled steel wire for bundling light loads.

Figure 9:
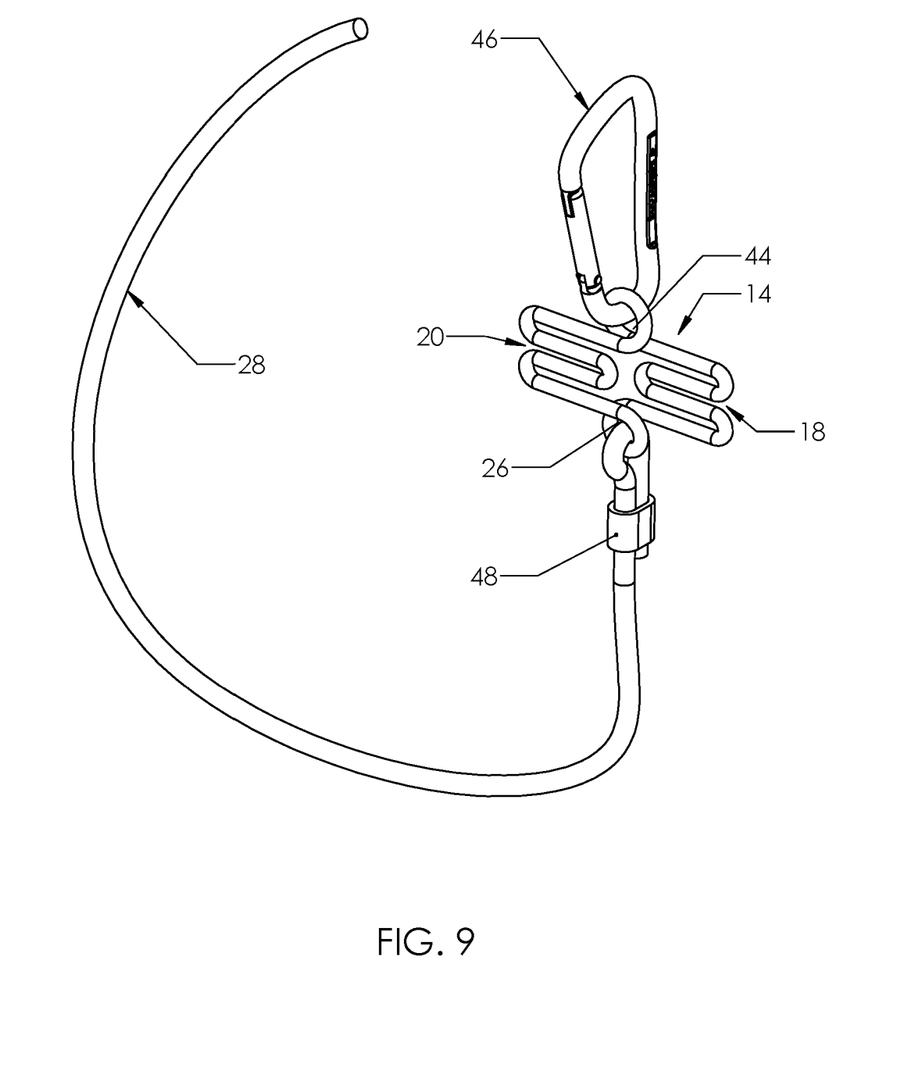
FIG. 9 is a perspective scale image of the locking buckle system using a locking work piece formed from cold rolled wire.

FIG. 9 shows an enablement of an actual locking buckle system 10 that is using a locking work piece 14 that has dual pairs of opposing channels. The locking work piece 14 that is shown is made of steel plate for loads requiring added security and for large load bundles.

Other Uses of the LBS

In addition to the uses all ready mentioned, it should be obvious that the locking work piece 14 can be made of plastic such as ABS, metal fiber glass, carbon fiber or from a combination of the materials mentioned above. The elastomeric cord 28 can formed from cylindrical, rectangular, or solid elastomeric material or from the same material that bungee cords are made. The elastomeric cord 28 can have a cross sectional shape other than a circle. A flat elastomer could be used to make the elastomeric cord. Rope or fabric could be used to make an equivalent, albeit non elastic version of the elastomeric cord 28. Early models of the claimed device used a hollow tubular material taken from conventional exercise devices purchased at a Wal-Mart Store, with which to make the elastomeric cord. The size of the LBS is not restricted and can be adjusted during its design and manufacture to accommodate any planned use.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for bundling two or more objects comprising:
    a locking work piece formed as a plate, the plate having at least a first pair of opposing channels and a second pair of opposing channels,
    an elastomeric cord,
    a means for coupling a first portion at a first end of the elastomeric cord to the work piece,
    a second portion of the elastomeric cord extending from the first portion and stretched and held in tension and wrapped around one or more objects to form
    a bundle,
the elastomeric cord second portion being held in tension passing through a first channel of the first pair of opposing channels, the first opposing channel having
    a channel width characterized to compress the second portion of the elastomeric cord, the second portion extending to a third portion of the elastomeric cord,
    the third portion or remainder of the elastomeric cord then being stretched and forced to pass through a second of the first pair of opposing channels or through a first channel of the second opposing pair of channels, the remaining fourth portion of the elastomeric cord being forced to pass through
    a remaining unoccupied opposing channel.

2. The system for bundling two or more objects of claim 1 wherein the first pair of opposing channels are formed through the locking work piece on a common central axis.

3. The system of claim 2, further comprising:
    the second pair of opposing channels formed through the locking work piece on a second common central axis, the first and second pairs of opposing channels are longitudinally displaced from each other as they penetrate and pass through the work piece.

4. The system of claim 2, wherein the locking work piece further comprises:
    an extension shaped to form a hook.

5. The system of claim 4, wherein the locking work piece further comprises:
    a second aperture for receiving the hook coupled to the elastomeric cord end.

6. The system of claim 1 wherein the elastomeric cord has an end coupled to a hook.

7. The system of claim 1 wherein a second end of the elastomeric cord is coupled to a hook.

8. The system of claim 7, wherein the locking work piece comprises:
    a second aperture for receiving the hook coupled to the elastomeric cord second end.

* * * * *